(12) United States Patent
Matsumura

(10) Patent No.: US 11,327,278 B2
(45) Date of Patent: *May 10, 2022

(54) LENS SYSTEM, CAMERA SYSTEM, AND IMAGING SYSTEM

(71) Applicant: PANASONIC INTELLECTUAL PROPERTY MANAGEMENT CO., LTD., Osaka (JP)

(72) Inventor: Yoshio Matsumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

This patent is subject to a terminal disclaimer.

(21) Appl. No.: 16/707,997

(22) Filed: Dec. 9, 2019

(65) Prior Publication Data

US 2020/0116982 A1    Apr. 16, 2020

Related U.S. Application Data

(63) Continuation of application No. PCT/JP2018/004775, filed on Feb. 13, 2018.

(30) Foreign Application Priority Data

Jun. 13, 2017    (JP) .............................. JP2017-115547

(51) Int. Cl.
  *G02B 9/64*    (2006.01)
  *G02B 13/18*    (2006.01)
  (Continued)

(52) U.S. Cl.
  CPC ............. *G02B 13/18* (2013.01); *G02B 13/04* (2013.01); *G02B 5/005* (2013.01); *G02B 9/64* (2013.01);
  (Continued)

(58) Field of Classification Search
  CPC ............. H04N 5/23238; H04N 5/2254; G02B 13/0045; G02B 13/18; G02B 13/06;
  (Continued)

(56) References Cited

U.S. PATENT DOCUMENTS 7,280,289 B2 *    10/2007    Yamakawa ............ G02B 13/06
                                                                        359/771
2004/0169726 A1    9/2004    Moustier et al.
(Continued)

FOREIGN PATENT DOCUMENTS

CN    101900868 A    12/2010
JP    53-127722 A    11/1978
(Continued)

OTHER PUBLICATIONS

The Extended European Search Report dated May 12, 2020 for the related European Patent Application Mo. 18818135.8.
(Continued)

*Primary Examiner* — Evelyn A Lester
(74) *Attorney, Agent, or Firm* — McDermott Will & Emery LLP

(57) ABSTRACT

A lens system is configured to form an image on an imaging element having a quadrilateral shape disposed on an optical axis, and includes a first free-curved lens being asymmetrical with respect to the optical axis. A free-curved surface of the first free-curved lens has negative refractive power at an intersection point between a circle separated from the optical axis by a length having a predetermined ratio with respect to a minimum image height and a first surface passing through the optical axis and parallel to longer sides of the imaging element, and positive refractive power at an intersection point between a circle separated from the optical axis by a length having the predetermined ratio with respect to the minimum image height and a second surface passing (Continued)

through the optical axis and parallel to shorter sides of the imaging element. The predetermined ratio ranges from 40% to 80% inclusive.

16 Claims, 11 Drawing Sheets

(51) Int. Cl.
*G02B 13/04* (2006.01)
*H04N 5/232* (2006.01)
*G02B 13/00* (2006.01)
*H04N 5/225* (2006.01)
*G02B 13/06* (2006.01)
*G02B 27/00* (2006.01)
*G02B 5/00* (2006.01)
*G02B 13/08* (2006.01)

(52) U.S. Cl.
CPC .......... *G02B 13/0045* (2013.01); *G02B 13/06* (2013.01); *G02B 13/08* (2013.01); *G02B 27/0025* (2013.01); *H04N 5/2254* (2013.01); *H04N 5/23238* (2013.01)

(58) Field of Classification Search
CPC ...... G02B 9/64; G02B 27/0025; G02B 13/04; G02B 13/08; G02B 5/005
USPC ....... 359/668, 671, 708, 710, 720, 725, 740, 359/750; 348/207.1, 335, 340, 36, 231.3
See application file for complete search history.

(56) References Cited

U.S. PATENT DOCUMENTS

| 2007/0133107 | A1* | 6/2007 | Ohzawa | G02B 13/06 |
| | | | | 359/749 |
| 2010/0079874 | A1 | 4/2010 | Kamei | |
| 2010/0195070 | A1 | 8/2010 | Loering et al. | |
| 2010/0302647 | A1 | 12/2010 | Hirose | |
| 2020/0011263 | A1* | 1/2020 | Matsuo | F02D 41/405 |
| 2020/0110245 | A1* | 4/2020 | Matsumura | G02B 9/64 |
| 2020/0110249 | A1* | 4/2020 | Matsumura | G02B 13/08 |

FOREIGN PATENT DOCUMENTS

| JP | 2006-011093 A | 1/2006 |
| JP | 2006-245742 A | 9/2006 |
| JP | 2010-085849 A | 4/2010 |
| JP | 2010-276755 A | 12/2010 |
| JP | 2016-148725 A | 8/2016 |
| WO | 2003/010599 A1 | 2/2003 |

OTHER PUBLICATIONS

English Translation of Chinese Office Action dated Jun. 23, 2021 for the related Chinese Patent Application No. 201880037456.1.

* cited by examiner

FIG. 1
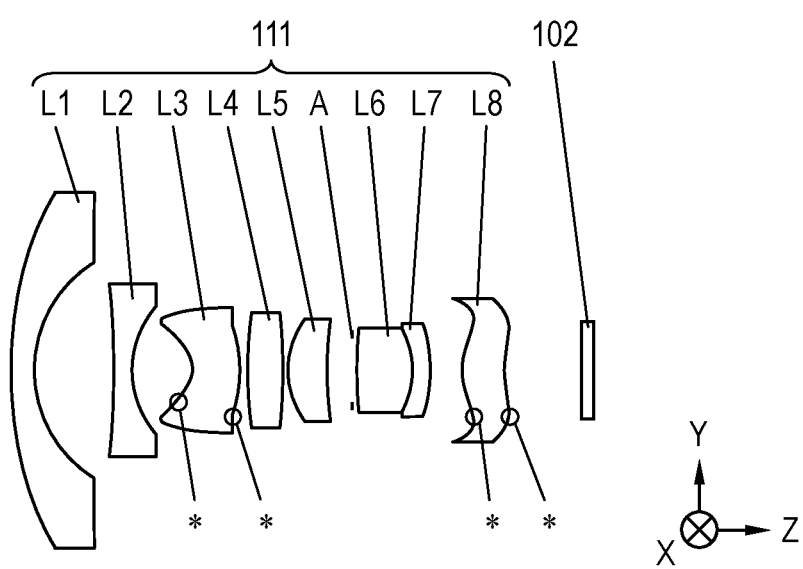
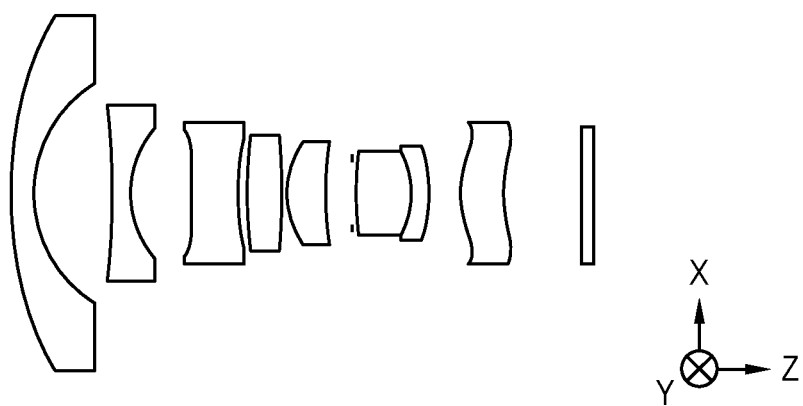

LENS SYSTEM, CAMERA SYSTEM, AND IMAGING SYSTEM

CROSS-REFERENCE OF RELATED APPLICATIONS

This application is a U.S. Continuation of International Patent Application No. PCT/JP2018/004775, filed on Feb. 13, 2018, which in turn claims the benefit of Japanese Application No. 2017-115547, filed on Jun. 13, 2017, the entire disclosures of which Applications are incorporated by reference herein.

BACKGROUND

1. Technical Field

The present disclosure relates to a lens system, a camera system, and an imaging system.

2. Description of the Related Art

A quadrilateral image formed by a lens that does not conform to a central projection style may collapse. When a quadrilateral imaging element is used, an optical image and the imaging element do not fully overlap with each other, increasing an unused region on a photosensitive surface.

Expanding a subject at a central portion around an optical axis and forming an image on an imaging element in terms of detection and recognition of the subject has been demanded, but has not yet been fully achieved so far.

Patent Literature (PTL) 1 discloses a method for capturing a panoramic image using an image sensor having an oblong shape. PTL 1 discloses that a toric lens is used as a fisheye objective lens to convert a circular image into a quadrilateral image to allow a quadrilateral imaging element to form the image.

Here, PTL 1 is WO 03/010599.

SUMMARY

A lens system capable of effectively utilizing a region of a photosensitive surface of a quadrilateral imaging element, and expanding a subject at a central portion around an optical axis, and a camera system and an imaging system including the lens system are provided.

A lens system according to the present disclosure is a lens system configured to form an image on an imaging element having a quadrilateral shape disposed on an optical axis, and includes a first free-curved lens being asymmetrical with respect to the optical axis. A free-curved surface of the first free-curved lens has negative refractive power with respect to a ray parallel to the optical axis at an intersection point between a circle separated from the optical axis by a length having a predetermined ratio with respect to a minimum image height and a first surface passing through the optical axis and parallel to longer sides of the imaging element, and positive refractive power with respect to a ray parallel to the optical axis at an intersection point between a circle separated from the optical axis by a length having a predetermined ratio with respect to the minimum image height and a second surface passing through the optical axis and parallel to shorter sides of the imaging element. The predetermined ratio ranges from 40% to 80% inclusive.

A camera system according to the present disclosure includes the lens system according to the present disclosure, described above, and the imaging element having a quadrilateral shape and disposed at a position at which the lens system forms an image on the optical axis.

An imaging system according to the present disclosure includes the lens system according to the present disclosure, described above, the imaging element having a quadrilateral shape and disposed at a position at which the lens system forms an image on the optical axis, and an image processor configured to process the image generated by the imaging element.

The present invention can achieve a lens system configured to form an approximately quadrilateral image, and to expand a subject at a central portion around an optical axis, and a camera system and an imaging system including the lens system.

BRIEF DESCRIPTION OF DRAWINGS

FIG. 1 is a lens layout diagram illustrating an infinity focusing state of a lens system according to a first exemplary embodiment.

DETAILED DESCRIPTION

Figure 2:
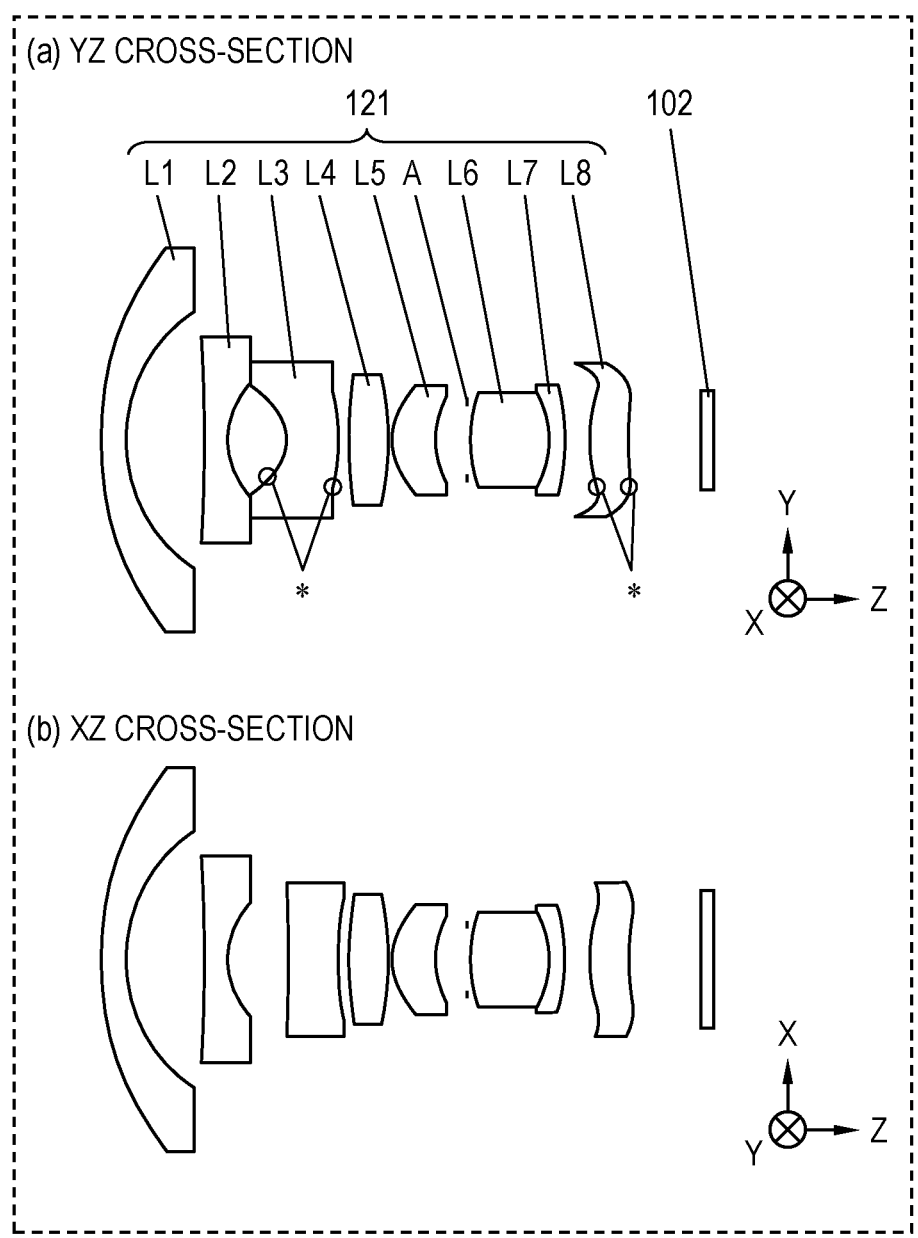
FIG. 2 is a lens layout diagram illustrating an infinity focusing state of a lens system according to a second exemplary embodiment.

Hereinafter, exemplary embodiments will be described in detail with reference to the drawings as appropriate. However, detailed description more than necessary may be omitted. For example, detailed description of well-known matters and redundant description of structures that are substantially the same may be omitted. These omissions are made to avoid unnecessary redundancy of the following description and to facilitate the understanding of those skilled in the art.

Note that the attached drawings and the following description are provided for those skilled in the art to fully understand the present disclosure, and are not intended to limit the subject matter as described in the appended claims.

First Exemplary Embodiment

FIG. 1 is a layout diagram of a lens system according to a first exemplary embodiment, illustrating an infinity focusing state.

Part (a) of FIG. 1 is a YZ cross-section, and part (b) of FIG. 1 is an XZ cross-section, each illustrating lens system 111 including eight lens elements, and quadrilateral imaging element 102 having shorter sides and longer sides. An X direction is a direction parallel to the longer sides of imaging element 102. A Y direction is a direction parallel to a shorter side direction of imaging element 102. A Z direction is a direction parallel to an optical axis. The YZ cross-section includes the optical axis, and is a plane parallel to the Y direction and the Z direction. The XZ cross-section includes the optical axis, and is a plane parallel to the X direction and the Z direction.

As illustrated in FIG. 1, lens system 111 according to the first exemplary embodiment includes, in order from an object side to an image surface side, five lens elements L1 to L5, aperture diaphragm A, and three lens elements L6 to L8. A position at which lens system 111 forms an image corresponds to an image surface of imaging element 102. In part (b) of FIG. 1, reference marks are omitted.

Lens system 111 will further be described in detail. Lens system 111 includes, in order from the object side to the image surface side, lens element L1 having a negative meniscus shape where a convex surface faces the object side, lens element L2 having both surfaces formed into concave shapes, lens element L3 having both surfaces formed into concave shapes, lens element L4 having both surfaces formed into convex shapes, lens element L5 having a positive meniscus shape where both surfaces are formed into aspherical shapes and a convex surface faces the object side, aperture diaphragm A, lens element L6 having both surfaces formed into convex shapes, lens element L7 having a negative meniscus shape where a convex surface faces the image surface side, and lens element L8 having a positive meniscus shape where a convex surface faces the object side. Lens element L6 and lens element L7 are joined with each other. In here, lens element L1 is an example of a first lens element, and lens element L2 is an example of a second lens element.

In lens system 111, lens element L3 and lens element L8 each have both surfaces respectively facing the object side and the image surface side and being XY-polynomial, free-curved surfaces. In FIG. 1, the free-curved surfaces are each added with an asterisk "*". In here, lens element L3 is an example of a first free-curved lens, and lens element L8 is an example of a second free-curved lens.

The free-curved surface, facing the image surface side, of lens element L3 has negative refractive power with respect to a ray parallel to the optical axis at an intersection point between a circle separated from the optical axis by a length having a predetermined ratio with respect to a minimum image height and an XZ plane (first surface) passing through the optical axis and parallel to the longer sides of the imaging element, and positive refractive power with respect to a ray parallel to the optical axis at an intersection point between a circle separated from the optical axis by a length having a predetermined ratio with respect to the minimum image height and a YZ plane (second surface) passing through the optical axis and parallel to the shorter sides of the imaging element. In here, in the present exemplary embodiment, all ratios correspond to the predetermined ratio with respect to the minimum image height. The free-curved surface, facing the image surface side, of lens element L3 has negative refractive power with respect to a ray parallel to the optical axis at all intersection points with the XZ plane, and positive refractive power with respect to a ray parallel to the optical axis at all intersection points with the YZ plane. Surface data of the lens elements will be described later. Shapes of surfaces of free-curved lenses and aspherical lenses correspond to shapes around the optical axis (peak) in the Y direction.

Second Exemplary Embodiment

FIG. 2 is a layout diagram of a lens system according to a second exemplary embodiment. Part (a) of FIG. 2 is a YZ cross-section, and part (b) of FIG. 2 is an XZ cross-section, each illustrating lens system 121 including eight lens elements, and quadrilateral imaging element 102 having shorter sides and longer sides. In part (b) of FIG. 2, reference marks are omitted. Compared with lens system 111 according to the first exemplary embodiment, lens system 121 according to the second exemplary embodiment is identical in number, kinds, and a disposition order of lens elements, but differs in surface data of lens system elements L1 to L8. Differences in surface data will be described later. In lens system 121, lens element L1 is an example of a first lens element, lens element L2 is an example of a second lens element, lens element L3 is an example of a first free-curved lens, and lens element L8 is an example of a second free-curved lens.

Even in lens system 121, the free-curved surface, facing the image surface side, of lens element L3 has negative refractive power with respect to a ray parallel to the optical axis at all intersection points with the XZ plane, and positive refractive power with respect to a ray parallel to the optical axis at all intersection points with the YZ plane.

Third Exemplary Embodiment

Figure 3:
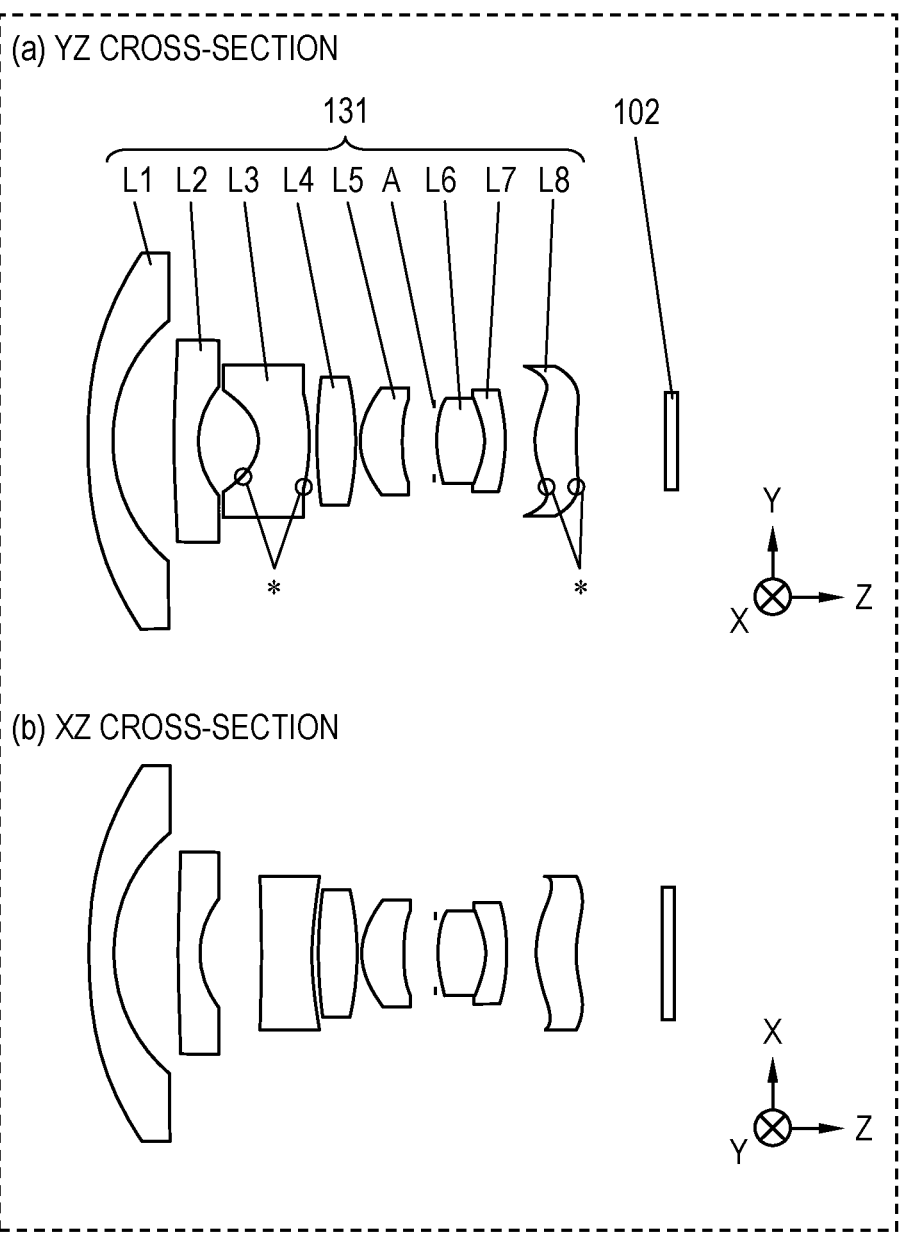
FIG. 3 is a lens layout diagram illustrating an infinity focusing state of a lens system according to a third exemplary embodiment.

FIG. 3 is a layout diagram of a lens system according to a third exemplary embodiment. Part (a) of FIG. 3 is a YZ cross-section, and part (b) of FIG. 3 is an XZ cross-section, each illustrating lens system 131 including eight lens elements, and quadrilateral imaging element 102 having shorter sides and longer sides. In part (b) of FIG. 3, reference marks are omitted. Compared with lens system 111 according to the first exemplary embodiment, lens system 131 according to the third exemplary embodiment is identical in number of lens elements, but differs in kind of lens element L2 and surface data of lens system elements L1 to L8. Lens element L2 has a negative meniscus shape where a convex surface faces the object side. Differences in surface data will be described later. In lens system 131, lens element L1 is an example of a first lens element, lens element L2 is an example of a second lens element, lens element L3 is an example of a first free-curved lens, and lens element L8 is an example of a second free-curved lens.

Even in lens system 131, the free-curved surface, facing the image surface side, of lens element L3 has negative refractive power with respect to a ray parallel to the optical axis at all intersection points with the XZ plane, and positive refractive power with respect to a ray parallel to the optical axis at all intersection points with the YZ plane.

Configurations Common to First to Third Exemplary Embodiments

The lens systems according to the first to third exemplary embodiments each include a plurality of lens elements to form an image on quadrilateral imaging element 102 having the shorter sides and the longer sides. The lens systems each include, as lens elements, the free-curved lenses that are rotational asymmetrical with respect to the optical axis. That is, the lens systems each include, in order from the object side to the image surface side, a plurality of the lens elements, an aperture diaphragm, and a plurality of the lens elements. With this configuration, an approximately quadrilateral image that is almost quadrilateral can be formed.

The lens systems according to the first to third exemplary embodiments each have such a configuration that includes at least three or more lens elements that are rotational symmetrical with respect to the optical axis. With this configuration, free-curved lenses have been reduced in number, minimizing unevenness in capability due to directions. Furthermore, the lens systems according to the first to third exemplary embodiments can advantageously shorten calculation periods during designing.

All the free-curved surfaces of the free-curved lenses configuring the lens systems according to the first to third exemplary embodiments, each having a shape that is symmetrical with respect to the XZ plane and the YZ plane, are advantageous in terms of that centers of the free-curved surfaces can be determined, allowing easy management on shapes during manufacturing.

The lens systems according to the first to third exemplary embodiments each have a configuration including, in order from the object side, lens element L1 being a meniscus having a convex shape facing the object side and negative power, and lens element L2 having negative power. This configuration is advantageous in terms of that light entering at a wider angle can be collected, a lens system with a wide field of view can be easily achieved, respective power can be reduced through the two negative lenses arranged in series, and shapes that are easily manufactured can be achieved.

The lens systems according to the first to third exemplary embodiments, each having a configuration where the free-curved lens disposed at a position most adjacent to the image surface side has both surfaces respectively being free-curved surfaces and respectively facing the object side and the image surface side, are advantageous in terms of that position control for image heights and aberration reductions can be easily performed.

The lens systems according to the first to third exemplary embodiments each include the fisheye lens having a half angle of view of 80° or wider. A wider angle of view can thus be covered. Fisheye lenses generally face difficulty in forming an image around diagonal positions of an imaging element. However, by using the free-curved lenses according to the present disclosure, an image can be formed even around the diagonal positions of an imaging element.

A lens system configured to form an image on a quadrilateral imaging element disposed on an optical axis, as can be seen in the lens systems according to the first to third exemplary embodiments, for example, includes a first free-curved lens being asymmetrical with respect to the optical axis. It is preferable that a free-curved surface of the first free-curved lens has negative refractive power with respect to a ray parallel to the optical axis at an intersection point between a circle separated from the optical axis by a length having a predetermined ratio with respect to a minimum image height and an XZ plane passing through the optical axis and parallel to the longer sides of the imaging element, and positive refractive power with respect to a ray parallel to the optical axis at an intersection point between a circle separated from the optical axis by a length having a predetermined ratio with respect to the minimum image height and a YZ plane passing through the optical axis and parallel to the shorter sides of the imaging element (hereinafter, the configuration is referred to as a basic configuration of the exemplary embodiments). In here, the predetermined ratio with respect to the minimum image height preferably ranges from 40% to 80% inclusive, and more preferably is 60%.

In here, the minimum image height refers to a shortest one among distances on an image surface, from an image point by a ray entering perpendicularly onto imaging element 102 to an end of an image circle formed by a lens system. The lens systems according to the first to third exemplary embodiments each have a minimum image height in the shorter side direction of imaging element 102.

The free-curved surface as can be seen on the first free-curved lens allows expanding an image at a central portion of an image circle around an optical axis, and capturing a subject present around the optical axis in an enlarged manner, leading to a higher detection and recognition rate. Furthermore, an image circle of a fisheye lens, which is normally circular, can be expanded in the longer side direction in particular. With a portion where positive and negative inversion occurs in refractive power of a free-curved surface, fine image-expanding effects can be achieved. With the portion where positive and negative inversion occurs in refractive power, which is separated from the optical axis by a length that ranges from 40% to 80% inclusive (more preferably, that is 60%) of a minimum image height in a radial direction, fine image-expanding effects can further be achieved.

When, different from the basic configuration of the present exemplary embodiments, a first free-curved lens does not have a free-curved surface having negative refractive power with respect to a ray parallel to the optical axis at an intersection point between a circle separated from the optical axis by a length having a predetermined ratio with respect to a minimum image height and an XZ plane, and positive refractive power with respect to a ray parallel to the optical axis at an intersection point between a circle separated from the optical axis by a length having a predetermined ratio with respect to the minimum image height and a YZ plane, an image cannot be fully expanded at a central region of a photosensitive surface of a quadrilateral imaging element. Otherwise, lens elements may increase in number, expanding a lens system in size. Such a lens having a free-curved surface, as described above, which has been difficult to manufacture so far, has become possible to manufacture as processing and molding techniques have been advancing in recent years.

It is preferable that a lens system having the basic configuration of the present exemplary embodiments, as can be seen in the lens systems according to the first to third exemplary embodiments, for example, satisfy the following condition (1).

$$\omega_{LONG} > 60° \quad (1)$$

where, $\omega_{LONG}$ is a maximum half angle of view in a longer side direction of the imaging element, and the condition (1) is a condition used for specifying a half angle of view of the lens system. Below a lower limit of the condition (1), the lens system narrows in angle of view. Even without the basic configuration of the present exemplary embodiments, an image circle can become approximately quadrilateral. The region of the photosensitive surface of imaging element 102 having a quadrilateral shape can be easily and effectively utilized. This case may however deviate from the purpose of the present application. Spherical aberrations become difficult to control as well.

By further satisfying at least either of the following conditions (1)' and (1)", the effects described above can further be achieved.

$$\omega_{LONG} > 80° \quad (1)'$$

$$\omega_{LONG} > 90° \quad (1)''$$

It is preferable that a lens system having the basic configuration of the present exemplary embodiments, as can be seen in the lens systems according to the first to third exemplary embodiments, for example, satisfy the following condition (2).

$$1 < D_{LSHORT}/D_{SSHORT} \quad (2)$$

where, $D_{LSHORT}$ is a maximum distance in the longer side direction between an image point with respect to incident light in the longer side direction of the imaging element and an image point with respect to incident light perpendicular to the imaging element, within an angle of view equivalent to a maximum half angle of view in the shorter side direction of the imaging element, $D_{SSHORT}$ is a maximum distance in the shorter side direction between an image point with respect to incident light and an image point with respect to incident light perpendicular to the imaging element, within the maximum half angle of view in the shorter side direction of the imaging element, and the condition (2) is a condition used for specifying that, for an image point with respect to incident light within a maximum half angle of view in the shorter side direction of the imaging element, an image height in the longer side direction of the imaging element becomes longer than an image height in the shorter side direction. Below a lower limit of the condition (2), effectively utilizing the region of the photosensitive surface of imaging element 102 having a quadrilateral shape becomes difficult. Curvatures of image surface become difficult to control as well.

By further satisfying at least either of the following conditions (2)' and (2)", the effects described above can further be achieved.

$$1.2 < D_{LSHORT}/D_{SSHORT} \quad (2)'$$

$$1.6 < D_{LSHORT}/D_{SSHORT} \quad (2)''$$

It is preferable that a lens system having the basic configuration of the present exemplary embodiments, as can be seen in the lens systems according to the first to third exemplary embodiments, for example, satisfy the following condition (3).

$$0.5 < D_{SSHORT} \times \omega_{LONG}/(D_{LLONG} \times \omega_{SHORT}) < 1 \quad (3)$$

where, $\omega_{LONG}$ is a maximum half angle of view in the longer side direction of the imaging element, $\omega_{SHORT}$ is a maximum half angle of view in the shorter side direction of the imaging element, $D_{LLONG}$ is a maximum distance in the longer side direction between an image point with respect to incident light and an image point with respect to incident light perpendicular to the imaging element, within a maximum half angle of view in the longer side direction of the imaging element, $D_{SSHORT}$ is a maximum distance in the shorter side direction between an image point with respect to incident light and an image point with respect to incident light perpendicular to the imaging element, within the maximum half angle of view in the shorter side direction of the imaging element, and the condition (3) is a condition used for specifying a ratio between the maximum half angle of view and an image height in each of the shorter side direction and the longer side direction of an imaging element. Below a lower limit of the condition (3), an angle of view in the shorter side direction becomes too wide, compared with an angle of view in the longer side direction. An image forming capability becomes difficult to control. In particular, curvatures of image surface become difficult to control. An image circle becomes otherwise too long in the longer side direction. Effectively utilizing the region of the photosensitive surface of imaging element 102 having a quadrilateral shape becomes difficult. Above an upper limit of the condition (3), an angle of view in the longer side direction becomes too wide, compared with an angle of view in the shorter side direction. An image forming capability becomes difficult to control. In particular, curvatures of image surface become difficult to control. An image circle becomes otherwise too long in the shorter side direction. Effectively utilizing the region of the photosensitive surface of imaging element 102 having a quadrilateral shape becomes difficult.

By further satisfying at least either of the following conditions (3)' and (3)", the effects described above can further be achieved.

$$0.55 < D_{SSHORT} \times \omega_{LONG}/(D_{LLONG} \times \omega_{SHORT}) < 0.9 \quad (3)'$$

$$0.6 < D_{SSHORT} \times \omega_{LONG}/(D_{LLONG} \times \omega_{SHORT}) < 0.8 \quad (3)''$$

It is preferable that a lens system having the basic configuration of the present exemplary embodiments, as can be seen in the lens systems according to the first to third exemplary embodiments, for example, satisfy the following condition (4).

$$\omega_{LONG} - \omega_{SHORT} > 0 \quad (4)$$

where, $\omega_{LONG}$ is a maximum half angle of view in the longer side direction of the imaging element, $\omega_{SHORT}$ is a maximum half angle of view in the shorter side direction of the imaging element, and the condition (4) is a condition used for specifying, for a maximum half angle of view, a difference between the longer side direction and the shorter side direction of the imaging element. Below a lower limit of the condition (4), an angle of view in the shorter side direction becomes equal to or greater than an angle of view of the longer side direction. An image would be formed in an extremely irregular shape. Resolution per angle of view would change greater between the longer side direction and the shorter side direction. Spherical aberrations become difficult to control as well, due to a greater change between the longer side direction and the shorter side direction.

By further satisfying the following condition (4)', the effects described above can further be achieved.

$$\omega_{LONG} - \omega_{SHORT} > 8 \quad (4)'$$

It is preferable that a lens system having the basic configuration of the present exemplary embodiments, as can be seen in the lens systems according to the first to third exemplary embodiments, for example, satisfy the following condition (5).

$$L \times Fno./D_{LLONG} < 40 \quad (5)$$

where,

L is an optical total length of the lens system,

Fno. is an F value of the lens system, $D_{LLONG}$ is a maximum distance in the longer side direction between an image point with respect to incident light and an image point with respect to incident light perpendicular to the imaging element, within the maximum half angle of view in the longer side direction of the imaging element, and the condition (5) is a condition used for specifying a relationship among an optical total length of the lens system, an F value of the lens system, and an image height in the longer side direction. Above an upper limit of the condition (5), the lens system becomes too greater in size with respect to the F value of the lens system and the image circle, preventing a small-sized lens system from being achieved. Curvatures of image surface become difficult to control as well.

By further satisfying at least either of the following conditions (5)' and (5)", the effects described above can further be achieved.

$$L \times Fno./D_{LLONG} < 30 \quad (5)'$$

$$L \times Fno./D_{LLONG} < 25 \quad (5)''$$

It is preferable that a lens system having the basic configuration of the present exemplary embodiments, as can be seen in the lens systems according to the first to third exemplary embodiments, for example, satisfy the following condition (6).

$$n_{FREE} < 1.7 \quad (6)$$

where, $n_{FREE}$ is a refraction factor with respect to a d-line of the free-curved lens, and the condition (6) is a condition used for specifying a refraction factor with respect to the d-line of the free-curved lens. Above an upper limit of condition (6), a refraction factor of the free-curved lens becomes too high, greatly bending a ray. Astigmatism becomes difficult to control. Effects of the condition can be achieved even when one of free-curved lenses in a lens system satisfies the condition. When a plurality of free-curved lenses satisfy the condition, the effects can further be achieved.

By further satisfying the following condition (6)', the effects described above can further be achieved.

$$n_{FREE} < 1.6 \quad (6)'$$

It is preferable that a lens system having the basic configuration of the present exemplary embodiments, as can be seen in the lens systems according to the first to third exemplary embodiments, for example, include aperture diaphragm A between an object and an imaging element, and satisfy the following condition (7).

$$-3 \leq N_o - N_i \leq 3 \quad (7)$$

where, $N_o$ is a number of lens elements disposed closer to the object than the aperture diaphragm is, $N_i$ is a number of lens elements disposed closer to the image surface than the aperture diaphragm is, and the condition (7) is a condition used for specifying a difference in number of lens elements in front of and behind aperture diaphragm A. Below a lower limit of the condition (7), the number of lens elements disposed closer to the image surface than aperture diaphragm A is becomes too greater. The lens system would become greater in size in an optical axis direction. In addition, the number of lens elements disposed closer to the object than aperture diaphragm A is becomes smaller. Curvatures of image surface become difficult to control. Above an upper limit of the condition (7), the number of lens elements disposed closer to the object than aperture diaphragm A is becomes too greater. The lens system would become greater in size in a radial direction. In addition, the number of lens elements disposed closer to the image surface than aperture diaphragm A is becomes smaller. Spherical aberrations become difficult to control.

By further satisfying the following condition (7)', the effects described above can further be achieved.

$$-2 \leq N_o - N_i \leq 2 \quad (7)'$$

It is preferable that a lens system having the basic configuration of the present exemplary embodiments, as can be seen in the lens systems according to the first to third exemplary embodiments, for example, include aperture diaphragm A between the object and imaging element 102, at least one first free-curved lens closer to the object than aperture diaphragm A is, and at least one second free-curved lens closer to the image surface than aperture diaphragm A is. Adopting the configuration described above is advantageous in terms of that curvatures of image surface can be reduced in any directions including the longer side direction, the shorter side direction, and a diagonal direction.

It is preferable that, in a lens system having the basic configuration of the present exemplary embodiments, as can be seen in the lens systems according to the first to third exemplary embodiments, for example, imaging element 102 do not include an image circle of the lens system. In particular, in a lens system using a free-curved lens, securing resolution around ends of an image circle is difficult in terms of designing and manufacturing. By allowing imaging element 102 to not include an image circle, a fine image forming capability can be secured on imaging element 102.

The lens elements configuring the lens systems according to the first to third exemplary embodiments are refraction-type lens elements only (i.e., such a type of lens elements that achieve deflection on an interface between media having different refraction factors) that deflect an incident ray through refraction. However, the present disclosure is not limited to use such lens elements. The lens systems may include, for example, one or any of diffraction-type lens elements that deflect an incident ray through diffraction, refraction and diffraction hybrid-type lens elements that deflect an incident ray through a combination of a diffraction effect and a refraction effect, and refractive index distribution-type lens elements that deflect an incident ray through refractive index distribution in a medium. In particular, when a diffraction structure is formed on an interface of media having different refraction factors in a refraction and diffraction hybrid-type lens element, wavelength dependency of diffraction efficiency is preferably improved.

The lenses configuring the lens systems according to the first to third exemplary embodiments have symmetrical surfaces with respect to the longer sides or the shorter sides of imaging element 102. However, even when asymmetrical surfaces are used, enough effects can be achieved, as long as the basic configuration of the present exemplary embodiments and the conditions are satisfied.

Fourth Exemplary Embodiment

Figure 4:
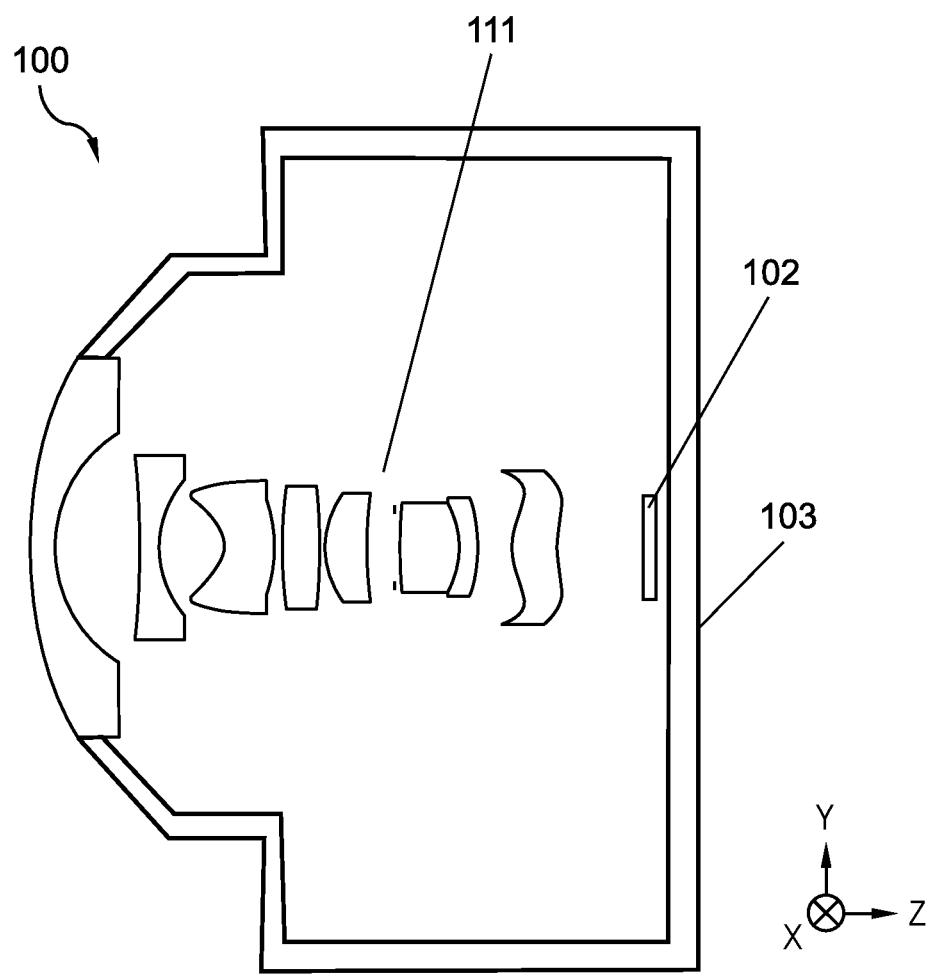
FIG. 4 is a schematic block diagram of a camera system according to a fourth exemplary embodiment.

FIG. 4 is a schematic block diagram of a camera system according to a fourth exemplary embodiment. Camera system 100 according to the fourth exemplary embodiment includes lens system 111, imaging element 102 configured to receive an optical image formed by lens system 111 and to convert the received optical image into an electrical image signal, and camera main body 103. The lens system of the fourth exemplary embodiment can be one of the lens systems according to the first to third exemplary embodiments. FIG. 4 illustrates a case where lens system 111 according to the first exemplary embodiment is used as a lens system.

In the fourth exemplary embodiment, one of the lens systems according to the first to third exemplary embodiments is used. Imaging element 102 can thus form an approximately quadrilateral image. Camera system 100 capable of effectively utilizing the region of the photosensitive surface of imaging element 102 having a quadrilateral shape to obtain an image can be achieved.

Fifth Exemplary Embodiment

Figure 5:
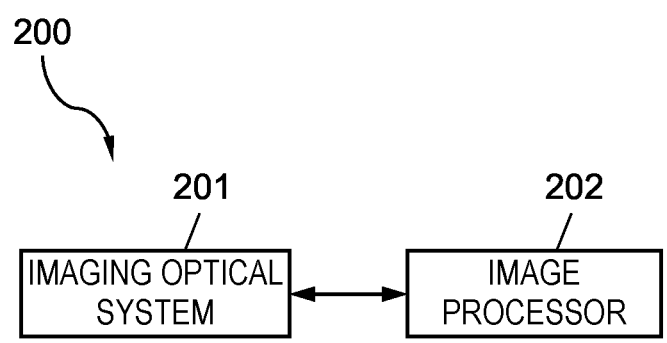
FIG. 5 is a schematic block diagram of an imaging system according to a fifth exemplary embodiment.

FIG. 5 is a schematic block diagram of an imaging system according to a fifth exemplary embodiment. As can be seen in camera system 100 according to the fourth exemplary embodiment, imaging optical system 201 used in imaging system 200 according to the fifth exemplary embodiment includes one of the lens systems according to the first to third exemplary embodiments. By allowing image processor 202 to process an image obtained by imaging optical system 201, the image can be modified and processed into an image applicable in various applications. Image processor 202 may be provided inside or outside of camera main body 103 (see FIG. 4).

First Numerical Value Example

A first numerical value example in which lens system 111 according to the first exemplary embodiment has been specifically implemented will be described herein. In the first numerical value example, a unit of length is "mm", and a unit of angle of view is "°" in the drawings and tables. In the first numerical value example, radius of curvature r, surface spacing d, refraction factor nd with respect to the d-line, and Abbe's number vd with respect to the d-line are illustrated. Sag amounts z of surfaces parallel to a Z axis of aspherical and free-curved surfaces are respectively defined by mathematical expression 1 and mathematical expression 2.

$$z = \frac{h^2/r}{1 + \sqrt{1 - (1+\kappa)(h/r)^2}} + \sum A_n h^n \quad \text{[Mathematical expression 1]}$$

where,
h is Height in radial direction,
k is Conic constant, and
An is n-th aspherical coefficient.

$$z = \frac{cr^2}{1 + \sqrt{1 - (1+k)c^2 r^2}} + \sum_{j=2}^{66} c_j x^p y^q \quad \text{[Mathematical expression 2]}$$

$$j = \frac{(p+q)^2 + p + 3q}{2} + 1$$

where,
c is Peak curvature,
k is Conic constant, and
$c_j$ is Coefficient.

Figure 6:
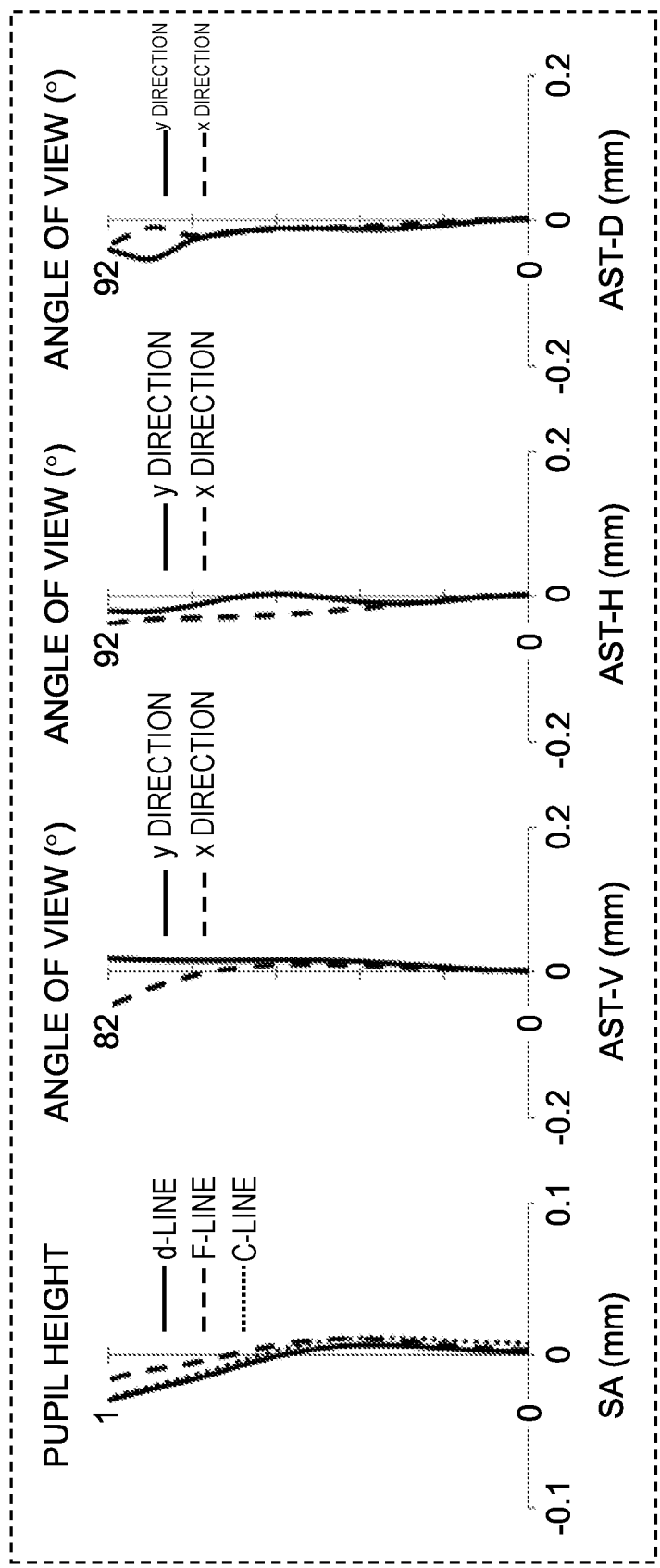
FIG. 6 is an aberration diagram illustrating spherical aberrations and curvatures of image surface in an infinity focusing state of a lens system according to a first numerical value example.

FIG. 6 is a spherical aberration diagram and astigmatism diagrams in an infinity focusing state of lens system 111 according to the first numerical value example. FIG. 6 illustrates, in order from left, spherical aberration (SA) in the shorter side direction of imaging element 102, astigmatism (AST-V), astigmatism (AST-H) in the longer side direction of imaging element 102, and astigmatism (AST-D) in the diagonal direction. In the spherical aberration diagram, a horizontal axis illustrates spherical aberrations, whereas a perpendicular axis illustrates pupil heights. A solid line illustrates a characteristic of the d-line. A short dashed line illustrates a characteristic of the C-line. A long dashed line illustrates a characteristic of the F-line. In the astigmatism diagrams, a horizontal axis illustrates astigmatism, whereas a perpendicular axis illustrates angles of view. A solid line illustrates a characteristic of a YZ plane (in the diagram, y direction). A dashed line illustrates a characteristic of an XZ plane (in the diagram, x direction).

The first exemplary embodiment uses only even-number terms, i.e., x and y, in the XY polynomial. The first exemplary embodiment is therefore symmetrical with respect to the x axis and the y axis. Astigmatism AST-D in the diagonal direction thus becomes identical in any directions.

Figure 7:
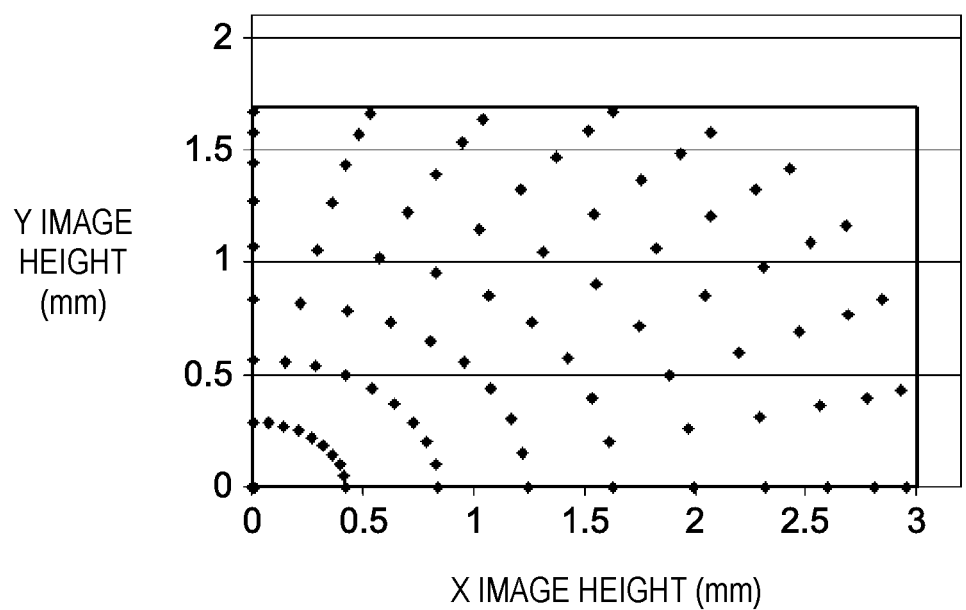
FIG. 7 is a diagram illustrating a relationship between an angle of view and an image point in the infinity focusing state of the lens system according to the first numerical value example.

FIG. 7 is a diagram illustrating a relationship between an angle of view and an image point in the infinity focusing state of lens system 111 according to the first numerical value example. FIG. 7 uses the optical axis as an origin (0,0), and plots image points per an angle of view of 10° in the first quadrant of the image surface. Other quadrants each have such a relationship, with the first quadrant, that each quadrant is line symmetrical with respect to the perpendicular axis and the horizontal axis. Compared with a normal rotational symmetrical lens, it can be seen that a shape of the image surface is expanded, and the region of the photosensitive surface of imaging element 102 having a quadrilateral shape is effectively utilized. Furthermore, as it is noticeable in particular in an X-image height direction, it can be seen that an image at a central portion around the optical axis is expanded greater than an image in a peripheral area separated from the optical axis.

Lens system 111 according to the first numerical value example corresponds to the first exemplary embodiment illustrated in FIG. 1. Surface data of lens system 111 according to the first numerical value example is illustrated in Table 1. Various kinds of data is illustrated in Table 2. Aspherical and free-curved surface data of a fifth surface, a sixth surface, a ninth surface, a tenth surface, a fifteenth surface, and a sixteenth surface is illustrated in Table 3, Table 4, Table 5, Table 6, Table 7, and Table 8, respectively.

TABLE 1

| s | Surface type | r | d | nd | vd |
|---|---|---|---|---|---|
| 1 | Spherical surface | 16.180 | 1.000 | 1.72916 | 54.7 |
| 2 | Spherical surface | 5.450 | 3.291 | | |
| 3 | Spherical surface | −42.838 | 0.800 | 1.77250 | 49.6 |
| 4 | Spherical surface | 3.975 | 2.580 | | |
| 5 | XY-polynomial surface | −5.534 | 2.000 | 1.49176 | 57.5 |
| 6 | XY-polynomial surface | 22.705 | 0.400 | | |
| 7 | Spherical surface | 16.681 | 1.500 | 1.80518 | 25.4 |
| 8 | Spherical surface | −21.386 | 0.150 | | |
| 9 | Aspherical surface | 3.354 | 1.700 | 1.49176 | 57.5 |
| 10 | Aspherical surface | 14.169 | 1.083 | | |

TABLE 1-continued

| s | Surface type | r | d | nd | vd |
|---|---|---|---|---|---|
| 11 | Plane | Diaphragm | 0.150 | | |
| 12 | Spherical surface | 12.980 | 2.370 | 1.59522 | 67.7 |
| 13 | Spherical surface | −3.270 | 0.700 | 1.95906 | 17.5 |
| 14 | Spherical surface | −7.511 | 1.380 | | |
| 15 | XY-polynomial surface | 3.672 | 1.800 | 1.49176 | 57.5 |
| 16 | XY-polynomial surface | 6.963 | 3.565 | | |

TABLE 2

| | |
|---|---|
| F number | 2.73 |
| Perpendicular half angle of view | 82° |
| Horizontal half angle of view | 92° |
| Perpendicular image height @ Perpendicular half angle of view | 1.687 |
| Horizontal image height @Horizontal half angle of view | 2.977 |
| Horizontal image height @ Perpendicular half angle of view | 2.841 |
| Optical total length | 24.470 |

TABLE 3

| s5 | |
|---|---|
| C1 | 1.00000E+00 |
| C2 | 0.00000E+00 |
| C3 | 0.00000E+00 |
| C4 | 8.62090E−02 |
| C5 | 0.00000E+00 |
| C6 | −2.36648E−01 |
| C7 | 0.00000E+00 |
| C8 | 0.00000E+00 |
| C9 | 0.00000E+00 |
| C10 | 0.00000E+00 |
| C11 | −3.77420E−03 |
| C12 | 0.00000E+00 |
| C13 | 1.35286E−02 |
| C14 | 0.00000E+00 |
| C15 | −1.43532E−02 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 4.24027E−04 |
| C23 | 0.00000E+00 |
| C24 | 2.32779E−03 |
| C25 | 0.00000E+00 |
| C26 | 1.27010E−03 |
| C27 | 0.00000E+00 |
| C28 | −1.65516E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | 9.02054E−06 |
| C38 | 0.00000E+00 |
| C39 | −6.93764E−05 |
| C40 | 0.00000E+00 |
| C41 | 6.68648E−05 |
| C42 | 0.00000E+00 |
| C43 | 5.41051E−04 |
| C44 | 0.00000E+00 |
| C45 | −3.70249E−04 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −6.79600E−06 |
| C57 | 0.00000E+00 |
| C58 | −2.00377E−05 |
| C59 | 0.00000E+00 |
| C60 | −3.45106E−05 |
| C61 | 0.00000E+00 |
| C62 | −1.58142E−04 |
| C63 | 0.00000E+00 |
| C64 | −3.69648E−04 |
| C65 | 0.00000E+00 |
| C66 | 3.33129E−04 |

TABLE 4

| s6 | |
|---|---|
| C1 | 0.00000E+00 |
| C2 | 0.00000E+00 |
| C3 | 0.00000E+00 |
| C4 | 3.60937E−02 |
| C5 | 0.00000E+00 |
| C6 | −1.09902E−01 |
| C7 | 0.00000E+00 |
| C8 | 0.00000E+00 |
| C9 | 0.00000E+00 |
| C10 | 0.00000E+00 |
| C11 | −7.77248E−03 |
| C12 | 0.00000E+00 |
| C13 | −1.67316E−04 |
| C14 | 0.00000E+00 |
| C15 | −9.60440E−04 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 1.51405E−03 |
| C23 | 0.00000E+00 |
| C24 | 3.72605E−03 |
| C25 | 0.00000E+00 |
| C26 | 3.01762E−03 |
| C27 | 0.00000E+00 |
| C28 | 9.09772E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.26271E−04 |
| C38 | 0.00000E+00 |
| C39 | −2.69927E−04 |
| C40 | 0.00000E+00 |
| C41 | −2.30127E−04 |
| C42 | 0.00000E+00 |
| C43 | −5.50409E−05 |
| C44 | 0.00000E+00 |
| C45 | 6.79574E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |

TABLE 4-continued s6

| | |
|---|---|
| C54 | 0.00000E+00 |
| C55 | 0.00000E+00 |
| C56 | 1.25389E−06 |
| C57 | 0.00000E+00 |
| C58 | −1.56641E−05 |
| C59 | 0.00000E+00 |
| C60 | −4.94111E−05 |
| C61 | 0.00000E+00 |
| C62 | −5.55090E−05 |
| C63 | 0.00000E+00 |
| C64 | −7.32391E−05 |
| C65 | 0.00000E+00 |
| C66 | −5.89790E−06 |

TABLE 5 s9

| | |
|---|---|
| K | −1.00000E+00 |
| A4 | 1.46543E−04 |
| A6 | 8.27051E−04 |
| A8 | 5.32119E−05 |
| A10 | 7.88739E−07 |
| A12 | 0.00000E+00 |
| A14 | 0.00000E+00 |
| A16 | 0.00000E+00 |
| A18 | 0.00000E+00 |
| A20 | 0.00000E+00 |

TABLE 6 s10

| | |
|---|---|
| K | 0.00000E+00 |
| A4 | 2.48173E−03 |
| A6 | −3.56816E−05 |
| A8 | 4.54625E−04 |
| A10 | −4.02723E−05 |
| A12 | 0.00000E+00 |
| A14 | 0.00000E+00 |
| A16 | 0.00000E+00 |
| A18 | 0.00000E+00 |
| A20 | 0.00000E+00 |

TABLE 7 s15

| | |
|---|---|
| C1 | 0.00000E+00 |
| C2 | 0.00000E+00 |
| C3 | 0.00000E+00 |
| C4 | −1.35833E−02 |
| C5 | 0.00000E+00 |
| C6 | 1.58217E−02 |
| C7 | 0.00000E+00 |
| C8 | 0.00000E+00 |
| C9 | 0.00000E+00 |
| C10 | 0.00000E+00 |
| C11 | −5.73414E−03 |
| C12 | 0.00000E+00 |
| C13 | 4.06591E−04 |
| C14 | 0.00000E+00 |
| C15 | −6.52448E−03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | −2.00409E−04 |
| C23 | 0.00000E+00 |

TABLE 7-continued s15

| | |
|---|---|
| C24 | −4.48983E−04 |
| C25 | 0.00000E+00 |
| C26 | 4.22990E−04 |
| C27 | 0.00000E+00 |
| C28 | −6.89639E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −3.48081E−05 |
| C38 | 0.00000E+00 |
| C39 | −1.47712E−04 |
| C40 | 0.00000E+00 |
| C41 | −3.39200E−04 |
| C42 | 0.00000E+00 |
| C43 | 2.21761E−05 |
| C44 | 0.00000E+00 |
| C45 | −4.37885E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −4.23355E−06 |
| C57 | 0.00000E+00 |
| C58 | 7.83237E−06 |
| C59 | 0.00000E+00 |
| C60 | 1.94777E−05 |
| C61 | 0.00000E+00 |
| C62 | −3.43515E−05 |
| C63 | 0.00000E+00 |
| C64 | 6.65521E−06 |
| C65 | 0.00000E+00 |
| C66 | −1.52826E−05 |

TABLE 8 s16

| | |
|---|---|
| C1 | 0.00000E+00 |
| C2 | 0.00000E+00 |
| C3 | 0.00000E+00 |
| C4 | 2.27047E−02 |
| C5 | 0.00000E+00 |
| C6 | 3.99957E−02 |
| C7 | 0.00000E+00 |
| C8 | 0.00000E+00 |
| C9 | 0.00000E+00 |
| C10 | 0.00000E+00 |
| C11 | −4.30563E−03 |
| C12 | 0.00000E+00 |
| C13 | 2.26638E−02 |
| C14 | 0.00000E+00 |
| C15 | −1.01597E−02 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 8.46224E−06 |
| C23 | 0.00000E+00 |
| C24 | 2.80139E−04 |
| C25 | 0.00000E+00 |
| C26 | 9.60494E−04 |
| C27 | 0.00000E+00 |

TABLE 8-continued

| s16 | |
|---|---|
| C28 | −1.85346E−03 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.18934E−04 |
| C38 | 0.00000E+00 |
| C39 | −4.08088E−04 |
| C40 | 0.00000E+00 |
| C41 | −6.35989E−04 |
| C42 | 0.00000E+00 |
| C43 | −1.36403E−04 |
| C44 | 0.00000E+00 |
| C45 | 1.55068E−06 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 6.26478E−06 |
| C57 | 0.00000E+00 |
| C58 | 2.99932E−05 |
| C59 | 0.00000E+00 |
| C60 | 5.70767E−05 |
| C61 | 0.00000E+00 |
| C62 | −1.16918E−05 |
| C63 | 0.00000E+00 |
| C64 | −5.62801E−06 |
| C65 | 0.00000E+00 |
| C66 | 1.05199E−05 |

Second Numerical Value Example

Figure 8:
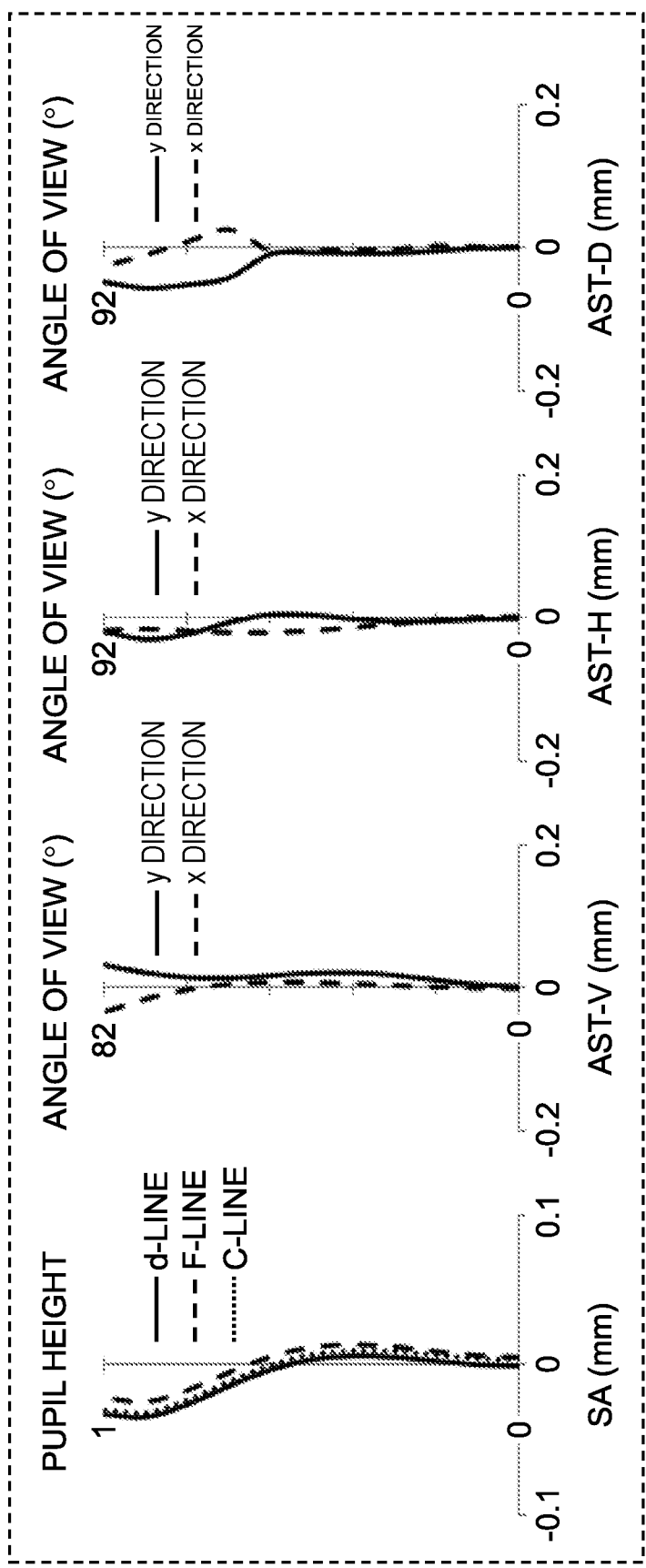
FIG. 8 is an aberration diagram illustrating spherical aberrations and curvatures of image surface in an infinity focusing state of a lens system according to a second numerical value example.
Figure 9:
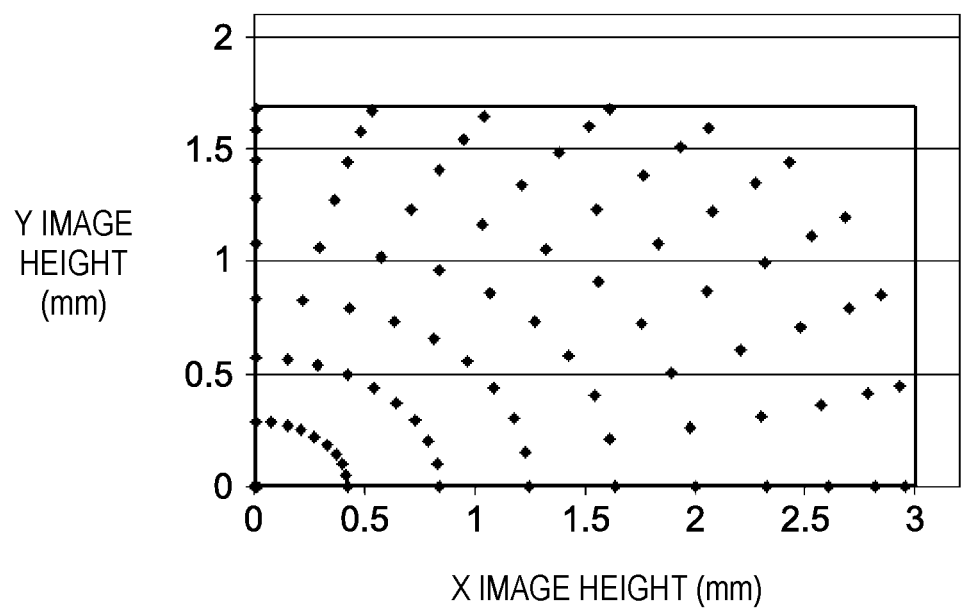
FIG. 9 is a diagram illustrating a relationship between an angle of view and an image point in the infinity focusing state of the lens system according to the second numerical value example.

FIG. 8 is a spherical aberration diagram and astigmatism diagrams in an infinity focusing state of lens system 121 according to the second numerical value example. FIG. 9 is a diagram illustrating a relationship between an angle of view and an image point in the infinity focusing state of lens system 121 according to the second numerical value example. Even in a case of lens system 121 illustrated in FIG. 9, compared with a normal rotational symmetrical lens, it can be seen that a shape of the image surface is expanded, and the region of the photosensitive surface of imaging element 102 having a quadrilateral shape is effectively utilized. As it is noticeable in particular in the X-image height direction, it can be seen that an image at a central portion around the optical axis is expanded greater than an image in a peripheral area separated from the optical axis. Lens system 121 according to the second numerical value example corresponds to the second exemplary embodiment illustrated in FIG. 2. Surface data of lens system 121 according to the second numerical value example is illustrated in Table 9. Various kinds of data is illustrated in Table 10. Aspherical and free-curved surface data of a fifth surface, a sixth surface, a ninth surface, a tenth surface, a fifteenth surface, and a sixteenth surface is illustrated in Table 11, Table 12, Table 13, Table 14, Table 15, and Table 16, respectively.

TABLE 9

| s | Surface type | r | d | nd | vd |
|---|---|---|---|---|---|
| 1 | Spherical surface | 12.146 | 1.000 | 1.72916 | 54.7 |
| 2 | Spherical surface | 6.000 | 3.132 | | |
| 3 | Spherical surface | −63.845 | 0.800 | 1.72916 | 54.7 |
| 4 | Spherical surface | 3.118 | 2.388 | | |
| 5 | XY-polynomial surface | −4.986 | 2.000 | 1.49176 | 57.5 |
| 6 | XY-polynomial surface | 15.806 | 0.429 | | |
| 7 | Spherical surface | 17.940 | 1.500 | 1.80610 | 40.9 |
| 8 | Spherical surface | −12.577 | 0.150 | | |
| 9 | Aspherical surface | 2.800 | 1.700 | 1.49176 | 57.5 |
| 10 | Aspherical surface | 3.914 | 1.256 | | |
| 11 | Plane | Diaphragm | 0.150 | | |
| 12 | Spherical surface | 5.525 | 3.096 | 1.59522 | 67.7 |
| 13 | Spherical surface | −3.672 | 0.600 | 1.95906 | 17.5 |
| 14 | Spherical surface | −9.084 | 0.922 | | |
| 15 | XY-polynomial surface | 5.053 | 1.600 | 1.49176 | 57.5 |
| 16 | XY-polynomial surface | 142.714 | 3.366 | | |

TABLE 10

| | |
|---|---|
| F number | 2.62 |
| Perpendicular half angle of view | 82° |
| Horizontal half angle of view | 92° |
| Perpendicular image height @ Perpendicular half angle of view | 1.689 |
| Horizontal image height @Horizontal half angle of view | 2.980 |
| Horizontal image height @ Perpendicular half angle of view | 2.852 |
| Optical total length | 24.090 |

TABLE 11

| s5 | |
|---|---|
| C1 | 1.00000E+00 |
| C2 | 0.00000E+00 |
| C3 | 0.00000E+00 |
| C4 | 9.82210E−02 |
| C5 | 0.00000E+00 |
| C6 | −2.39764E−01 |
| C7 | 0.00000E+00 |
| C8 | 0.00000E+00 |
| C9 | 0.00000E+00 |
| C10 | 0.00000E+00 |
| C11 | −2.60552E−03 |
| C12 | 0.00000E+00 |
| C13 | 1.97713E−02 |
| C14 | 0.00000E+00 |
| C15 | −3.46932E−03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 5.65340E−04 |
| C23 | 0.00000E+00 |
| C24 | 1.80561E−03 |
| C25 | 0.00000E+00 |
| C26 | −1.00004E−03 |
| C27 | 0.00000E+00 |
| C28 | 2.52224E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | 5.85414E−06 |
| C38 | 0.00000E+00 |
| C39 | −9.46390E−05 |

TABLE 11-continued s5

| | |
|---|---|
| C40 | 0.00000E+00 |
| C41 | 3.40232E−04 |
| C42 | 0.00000E+00 |
| C43 | 1.38751E−04 |
| C44 | 0.00000E+00 |
| C45 | −1.86517E−04 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −1.78179E−06 |
| C57 | 0.00000E+00 |
| C58 | 5.50349E−06 |
| C59 | 0.00000E+00 |
| C60 | 5.98934E−07 |
| C61 | 0.00000E+00 |
| C62 | −1.08733E−04 |
| C63 | 0.00000E+00 |
| C64 | −7.09955E−05 |
| C65 | 0.00000E+00 |
| C66 | 1.03808E−04 |

TABLE 12 s6

| | |
|---|---|
| C1 | 0.00000E+00 |
| C2 | 0.00000E+00 |
| C3 | 0.00000E+00 |
| C4 | 4.36756E−02 |
| C5 | 0.00000E+00 |
| C6 | −1.08803E−01 |
| C7 | 0.00000E+00 |
| C8 | 0.00000E+00 |
| C9 | 0.00000E+00 |
| C10 | 0.00000E+00 |
| C11 | −9.69054E−03 |
| C12 | 0.00000E+00 |
| C13 | −1.00811E−03 |
| C14 | 0.00000E+00 |
| C15 | 1.10290E−03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 1.66097E−03 |
| C23 | 0.00000E+00 |
| C24 | 3.24024E−03 |
| C25 | 0.00000E+00 |
| C26 | 2.20941E−03 |
| C27 | 0.00000E+00 |
| C28 | 8.02693E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.64068E−04 |
| C38 | 0.00000E+00 |
| C39 | −4.22454E−04 |
| C40 | 0.00000E+00 |
| C41 | −4.43373E−04 |
| C42 | 0.00000E+00 |
| C43 | −3.51086E−04 |

TABLE 12-continued s6

| | |
|---|---|
| C44 | 0.00000E+00 |
| C45 | −3.42007E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 6.00027E−06 |
| C57 | 0.00000E+00 |
| C58 | 1.56463E−05 |
| C59 | 0.00000E+00 |
| C60 | 1.94011E−05 |
| C61 | 0.00000E+00 |
| C62 | 2.07297E−05 |
| C63 | 0.00000E+00 |
| C64 | 1.00502E−05 |
| C65 | 0.00000E+00 |
| C66 | 3.26489E−06 |

TABLE 13 s9

| | |
|---|---|
| K | −1.00000E+00 |
| A4 | 1.53994E−03 |
| A6 | 1.18079E−03 |
| A8 | −1.21875E−04 |
| A10 | 2.44032E−05 |
| A12 | 0.00000E+00 |
| A14 | 0.00000E+00 |
| A16 | 0.00000E+00 |
| A18 | 0.00000E+00 |
| A20 | 0.00000E+00 |

TABLE 14 s10

| | |
|---|---|
| K | 0.00000E+00 |
| A4 | 4.82378E−03 |
| A6 | 3.63028E−04 |
| A8 | 3.22947E−04 |
| A10 | 3.85786E−05 |
| A12 | 0.00000E+00 |
| A14 | 0.00000E+00 |
| A16 | 0.00000E+00 |
| A18 | 0.00000E+00 |
| A20 | 0.00000E+00 |

TABLE 15 s15

| | |
|---|---|
| C1 | 0.00000E+00 |
| C2 | 0.00000E+00 |
| C3 | 0.00000E+00 |
| C4 | 3.89778E−03 |
| C5 | 0.00000E+00 |
| C6 | 1.91856E−02 |
| C7 | 0.00000E+00 |
| C8 | 0.00000E+00 |
| C9 | 0.00000E+00 |
| C10 | 0.00000E+00 |
| C11 | −3.09721E−03 |
| C12 | 0.00000E+00 |
| C13 | 4.56851E−03 |

TABLE 15-continued s15

| | |
|---|---|
| C14 | 0.00000E+00 |
| C15 | −3.09483E−03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | −1.25804E−04 |
| C23 | 0.00000E+00 |
| C24 | 1.20055E−04 |
| C25 | 0.00000E+00 |
| C26 | 8.97173E−04 |
| C27 | 0.00000E+00 |
| C28 | −6.94896E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −4.00939E−05 |
| C38 | 0.00000E+00 |
| C39 | −1.62966E−04 |
| C40 | 0.00000E+00 |
| C41 | −4.17055E−04 |
| C42 | 0.00000E+00 |
| C43 | 1.81808E−04 |
| C44 | 0.00000E+00 |
| C45 | −5.37771E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −2.70980E−06 |
| C57 | 0.00000E+00 |
| C58 | 1.77985E−05 |
| C59 | 0.00000E+00 |
| C60 | 4.38182E−05 |
| C61 | 0.00000E+00 |
| C62 | −3.20220E−05 |
| C63 | 0.00000E+00 |
| C64 | 7.06257E−06 |
| C65 | 0.00000E+00 |
| C66 | −1.17007E−05 |

TABLE 16 s16

| | |
|---|---|
| C1 | 0.00000E+00 |
| C2 | 0.00000E+00 |
| C3 | 0.00000E+00 |
| C4 | 4.78645E−02 |
| C5 | 0.00000E+00 |
| C6 | 4.56322E−02 |
| C7 | 0.00000E+00 |
| C8 | 0.00000E+00 |
| C9 | 0.00000E+00 |
| C10 | 0.00000E+00 |
| C11 | −2.06385E−03 |
| C12 | 0.00000E+00 |
| C13 | 2.14463E−02 |
| C14 | 0.00000E+00 |
| C15 | −3.41602E−03 |
| C16 | 0.00000E+00 |
| C17 | 0.00000E+00 |

TABLE 16-continued s16

| | |
|---|---|
| C18 | 0.00000E+00 |
| C19 | 0.00000E+00 |
| C20 | 0.00000E+00 |
| C21 | 0.00000E+00 |
| C22 | 1.60593E−04 |
| C23 | 0.00000E+00 |
| C24 | 1.06866E−03 |
| C25 | 0.00000E+00 |
| C26 | 2.08534E−03 |
| C27 | 0.00000E+00 |
| C28 | −1.71143E−03 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.23326E−04 |
| C38 | 0.00000E+00 |
| C39 | −3.31890E−04 |
| C40 | 0.00000E+00 |
| C41 | −5.05216E−04 |
| C42 | 0.00000E+00 |
| C43 | 1.48931E−04 |
| C44 | 0.00000E+00 |
| C45 | −1.03464E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 5.44613E−06 |
| C57 | 0.00000E+00 |
| C58 | 2.64149E−05 |
| C59 | 0.00000E+00 |
| C60 | 4.87517E−05 |
| C61 | 0.00000E+00 |
| C62 | −1.94661E−05 |
| C63 | 0.00000E+00 |
| C64 | −4.56261E−05 |
| C65 | 0.00000E+00 |
| C66 | 3.12212E−06 |

Third Numerical Value Example

Figure 10:
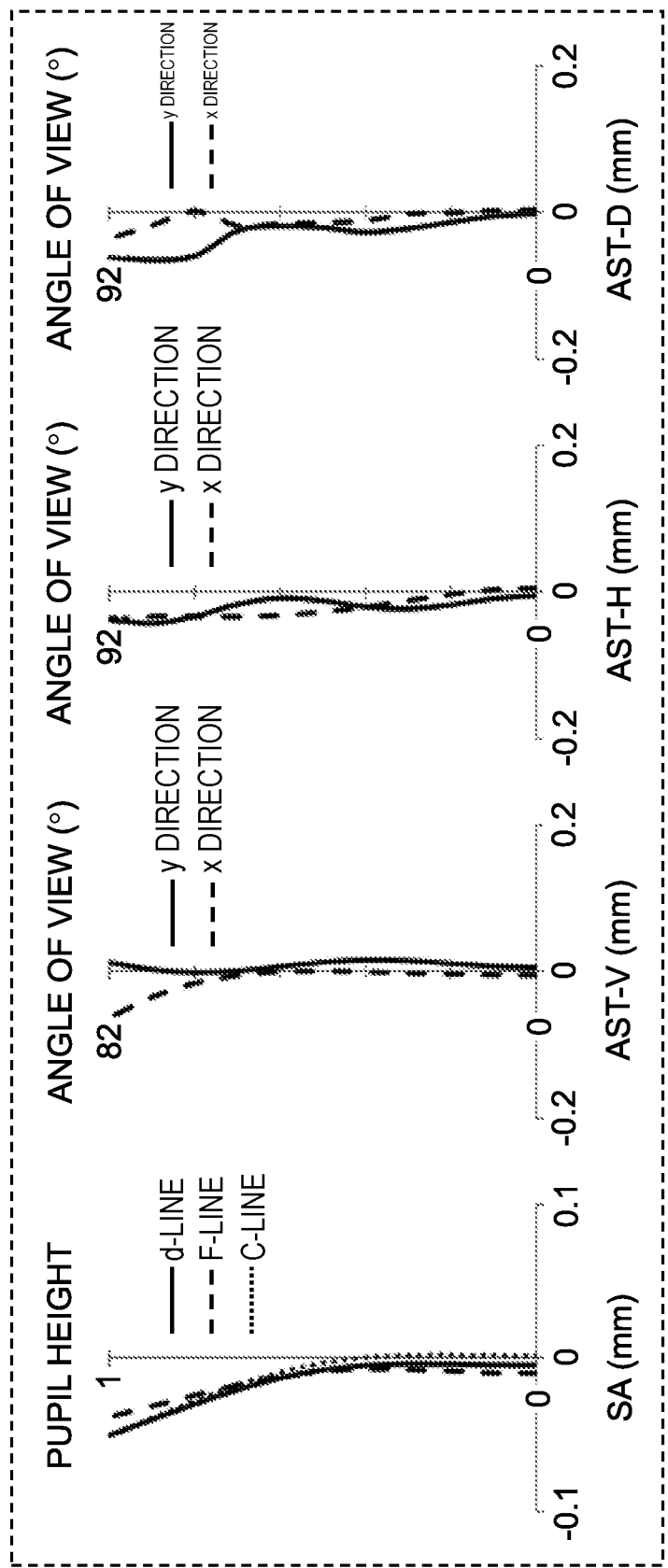
FIG. 10 is an aberration diagram illustrating spherical aberrations and curvatures of image surface in an infinity focusing state of a lens system according to a third numerical value example.
Figure 11:
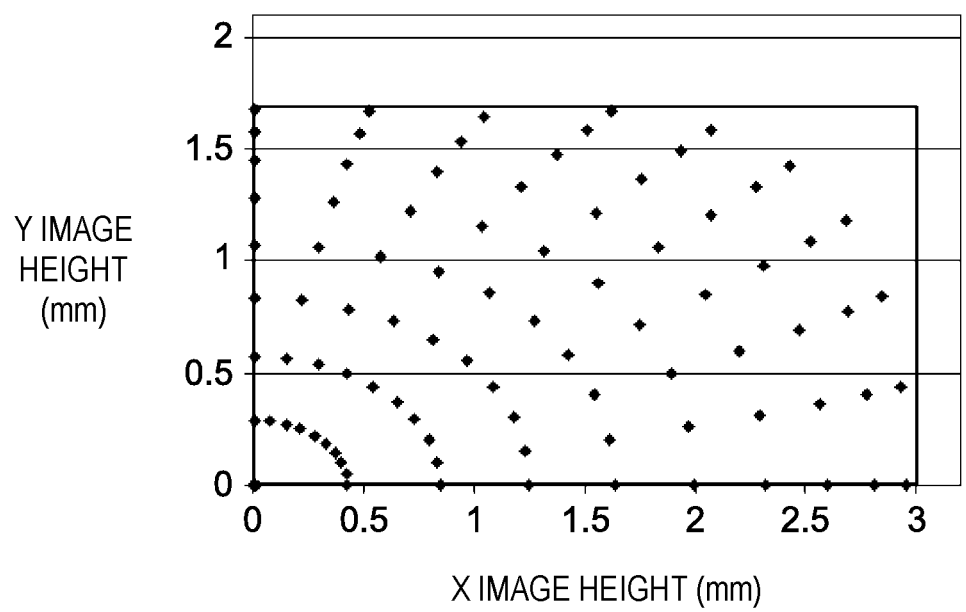
FIG. 11 is a diagram illustrating a relationship between an angle of view and an image point in the infinity focusing state of the lens system according to the third numerical value example.

FIG. 10 is a spherical aberration diagram and astigmatism diagrams in an infinity focusing state of lens system 131 according to a third numerical value example. FIG. 11 is a diagram illustrating a relationship between an angle of view and an image point in the infinity focusing state of lens system 131 according to the third numerical value example. Even in a case of lens system 131 illustrated in FIG. 11, compared with a normal rotational symmetrical lens, it can be seen that a shape of the image surface is expanded, and the region of the photosensitive surface of imaging element 102 having a quadrilateral shape is effectively utilized. As it is noticeable in particular in the X-image height direction, it can be seen that an image at a central portion around the optical axis is expanded greater than an image in a peripheral area separated from the optical axis. Lens system 131 according to the third numerical value example corresponds to the third exemplary embodiment illustrated in FIG. 3. Surface data of lens system 131 according to the third numerical value example is illustrated in Table 17. Various kinds of data is illustrated in Table 18. Aspherical and free-curved surface data of a fifth surface, a sixth surface, a ninth surface, a tenth surface, a fifteenth surface, and a sixteenth surface is illustrated in Table 19, Table 20, Table 21, Table 22, Table 23, and Table 24, respectively.

TABLE 17

| s | Surface type | r | d | nd | vd |
|---|---|---|---|---|---|
| 1 | Spherical surface | 14.553 | 1.000 | 1.72916 | 54.7 |
| 2 | Spherical surface | 6.097 | 2.538 | | |
| 3 | Spherical surface | 228.080 | 0.800 | 1.72916 | 54.7 |
| 4 | Spherical surface | 2.960 | 2.428 | | |
| 5 | XY-polynomial surface | −5.714 | 2.000 | 1.49176 | 57.5 |
| 6 | XY-polynomial surface | 22.440 | 0.312 | | |
| 7 | Spherical surface | 19.648 | 1.500 | 1.90366 | 31.3 |
| 8 | Spherical surface | −13.743 | 0.150 | | |
| 9 | Aspherical surface | 2.888 | 1.700 | 1.49176 | 57.5 |
| 10 | Aspherical surface | 5.269 | 1.202 | | |
| 11 | Plane | Diaphragm | 0.150 | | |
| 12 | Spherical surface | 4.659 | 1.900 | 1.49700 | 81.6 |
| 13 | Spherical surface | −2.730 | 0.800 | 1.80809 | 22.8 |
| 14 | Spherical surface | −9.560 | 1.131 | | |
| 15 | XY-polynomial surface | 4.208 | 1.600 | 1.49176 | 57.5 |
| 16 | XY-polynomial surface | 7.311 | 3.513 | | |

TABLE 18

| | |
|---|---|
| F number | 2.58 |
| Perpendicular half angle of view | 82° |
| Horizontal half angle of view | 92° |
| Perpendicular image height @ Perpendicular half angle of view | 1.690 |
| Horizontal image height @Horizontal half angle of view | 2.981 |
| Horizontal image height @ Perpendicular half angle of view | 2.843 |
| Optical total length | 22.730 |

TABLE 19

| s5 | |
|---|---|
| C1 | 1.00000E+00 |
| C2 | 0.00000E+00 |
| C3 | 0.00000E+00 |
| C4 | 7.95195E−02 |
| C5 | 0.00000E+00 |
| C6 | −2.70228E−01 |
| C7 | 0.00000E+00 |
| C8 | 0.00000E+00 |
| C9 | 0.00000E+00 |
| C10 | 0.00000E+00 |
| C11 | −3.79164E−03 |
| C12 | 0.00000E+00 |
| C13 | 1.90965E−02 |
| C14 | 0.00000E+00 |
| C15 | −5.19095E−03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 4.44944E−04 |
| C23 | 0.00000E+00 |
| C24 | 1.74029E−03 |
| C25 | 0.00000E+00 |
| C26 | −1.96821E−03 |
| C27 | 0.00000E+00 |
| C28 | −1.07453E−04 |
| C29 | 0.00000E+00 |
| C30 | 0.00000E+00 |
| C31 | 0.00000E+00 |
| C32 | 0.00000E+00 |
| C33 | 0.00000E+00 |

TABLE 19-continued

| s5 | |
|---|---|
| C34 | 0.00000E+00 |
| C35 | 0.00000E+00 |
| C36 | 0.00000E+00 |
| C37 | 2.02496E−05 |
| C38 | 0.00000E+00 |
| C39 | −1.25376E−04 |
| C40 | 0.00000E+00 |
| C41 | 3.06692E−04 |
| C42 | 0.00000E+00 |
| C43 | 2.04615E−04 |
| C44 | 0.00000E+00 |
| C45 | −2.92854E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −6.39091E−06 |
| C57 | 0.00000E+00 |
| C58 | −2.12702E−06 |
| C59 | 0.00000E+00 |
| C60 | −1.95101E−06 |
| C61 | 0.00000E+00 |
| C62 | −1.78867E−04 |
| C63 | 0.00000E+00 |
| C64 | −1.61685E−04 |
| C65 | 0.00000E+00 |
| C66 | 5.82373E−05 |

TABLE 20

| s6 | |
|---|---|
| C1 | 0.00000E+00 |
| C2 | 0.00000E+00 |
| C3 | 0.00000E+00 |
| C4 | 5.62528E−02 |
| C5 | 0.00000E+00 |
| C6 | −9.86555E−02 |
| C7 | 0.00000E+00 |
| C8 | 0.00000E+00 |
| C9 | 0.00000E+00 |
| C10 | 0.00000E+00 |
| C11 | −1.04079E−02 |
| C12 | 0.00000E+00 |
| C13 | −9.69687E−04 |
| C14 | 0.00000E+00 |
| C15 | 1.32574E−03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 1.70381E−03 |
| C23 | 0.00000E+00 |
| C24 | 3.38519E−03 |
| C25 | 0.00000E+00 |
| C26 | 2.05118E−03 |
| C27 | 0.00000E+00 |
| C28 | 7.52570E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.72282E−04 |

TABLE 20-continued

| s6 | |
|---|---|
| C38 | 0.00000E+00 |
| C39 | −4.47705E−04 |
| C40 | 0.00000E+00 |
| C41 | −4.12353E−04 |
| C42 | 0.00000E+00 |
| C43 | −2.91674E−04 |
| C44 | 0.00000E+00 |
| C45 | 6.64605E−06 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 6.11179E−06 |
| C57 | 0.00000E+00 |
| C58 | 1.44670E−05 |
| C59 | 0.00000E+00 |
| C60 | 1.13805E−05 |
| C61 | 0.00000E+00 |
| C62 | 7.10033E−06 |
| C63 | 0.00000E+00 |
| C64 | −6.07779E−06 |
| C65 | 0.00000E+00 |
| C66 | −5.44565E−06 |

TABLE 21

| s9 | |
|---|---|
| K | −1.00000E+00 |
| A4 | 1.75219E−04 |
| A6 | 6.17357E−04 |
| A8 | 2.82727E−05 |
| A10 | 1.73992E−07 |
| A12 | 0.00000E+00 |
| A14 | 0.00000E+00 |
| A16 | 0.00000E+00 |
| A18 | 0.00000E+00 |
| A20 | 0.00000E+00 |

TABLE 22

| s10 | |
|---|---|
| K | 0.00000E+00 |
| A4 | 8.82822E−04 |
| A6 | −2.64981E−04 |
| A8 | 3.28100E−04 |
| A10 | −3.61474E−05 |
| A12 | 0.00000E+00 |
| A14 | 0.00000E+00 |
| A16 | 0.00000E+00 |
| A18 | 0.00000E+00 |
| A20 | 0.00000E+00 |

TABLE 23

| s15 | |
|---|---|
| C1 | 0.00000E+00 |
| C2 | 0.00000E+00 |
| C3 | 0.00000E+00 |
| C4 | 1.73753E−02 |
| C5 | 0.00000E+00 |
| C6 | 2.75432E−02 |
| C7 | 0.00000E+00 |

TABLE 23-continued

| s15 | |
|---|---|
| C8 | 0.00000E+00 |
| C9 | 0.00000E+00 |
| C10 | 0.00000E+00 |
| C11 | −4.24756E−03 |
| C12 | 0.00000E+00 |
| C13 | 3.28055E−03 |
| C14 | 0.00000E+00 |
| C15 | −3.81993E−03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | −9.08170E−05 |
| C23 | 0.00000E+00 |
| C24 | −1.94783E−05 |
| C25 | 0.00000E+00 |
| C26 | 8.51458E−04 |
| C27 | 0.00000E+00 |
| C28 | −7.76743E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −3.29850E−05 |
| C38 | 0.00000E+00 |
| C39 | −1.30505E−04 |
| C40 | 0.00000E+00 |
| C41 | −3.82728E−04 |
| C42 | 0.00000E+00 |
| C43 | 1.13888E−04 |
| C44 | 0.00000E+00 |
| C45 | −6.75748E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −3.98041E−06 |
| C57 | 0.00000E+00 |
| C58 | 6.63102E−06 |
| C59 | 0.00000E+00 |
| C60 | 3.58460E−05 |
| C61 | 0.00000E+00 |
| C62 | −3.51608E−05 |
| C63 | 0.00000E+00 |
| C64 | 4.59428E−06 |
| C65 | 0.00000E+00 |
| C66 | −1.32062E−05 |

TABLE 24

| s16 | |
|---|---|
| C1 | 0.00000E+00 |
| C2 | 0.00000E+00 |
| C3 | 0.00000E+00 |
| C4 | 4.64459E−03 |
| C5 | 0.00000E+00 |
| C6 | −3.91406E−03 |
| C7 | 0.00000E+00 |
| C8 | 0.00000E+00 |
| C9 | 0.00000E+00 |
| C10 | 0.00000E+00 |
| C11 | −1.72470E−03 |

TABLE 24-continued s16

| | |
|---|---|
| C12 | 0.00000E+00 |
| C13 | 2.46574E-02 |
| C14 | 0.00000E+00 |
| C15 | -2.55342E-03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 1.10866E-04 |
| C23 | 0.00000E+00 |
| C24 | 8.67124E-04 |
| C25 | 0.00000E+00 |
| C26 | 1.82824E-03 |
| C27 | 0.00000E+00 |
| C28 | -1.98552E-03 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | -1.39729E-04 |
| C38 | 0.00000E+00 |
| C39 | -4.03490E-04 |
| C40 | 0.00000E+00 |
| C41 | -6.42035E-04 |
| C42 | 0.00000E+00 |
| C43 | -6.86474E-05 |
| C44 | 0.00000E+00 |
| C45 | -9.39401E-05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 6.32420E-06 |
| C57 | 0.00000E+00 |
| C58 | 2.50104E-05 |
| C59 | 0.00000E+00 |
| C60 | 6.37206E-05 |
| C61 | 0.00000E+00 |
| C62 | -2.58988E-05 |
| C63 | 0.00000E+00 |
| C64 | -2.25432E-05 |
| C65 | 0.00000E+00 |
| C66 | 1.74677E-05 |

Table 25 described below illustrates corresponding values to the conditions in the lens systems according to the numerical value examples.

Corresponding Values to Conditions

TABLE 25

| | First numerical value example | Second numerical value example | Third numerical value example |
|---|---|---|---|
| Condition (1) | 92.0 | 92.0 | 92.0 |
| Condition (2) | 1.684 | 1.689 | 1.682 |
| Condition (3) | 0.636 | 0.636 | 0.636 |
| Condition (4) | 10 | 10 | 10 |
| Condition (5) | 22.438 | 21.177 | 19.672 |
| Condition (6) | 1.49175 | 1.49175 | 1.49175 |
| Condition (7) | 2 | 2 | 2 |

INDUSTRIAL APPLICABILITY

The lens systems according to the implementations are applicable to digital still cameras, digital video cameras, cameras of cellular phones, cameras of personal digital assistances (PDAs), monitoring cameras of monitoring systems, Web cameras, and on-vehicle cameras, for example. In particular, the lens systems according to the implementations are preferable for photographing optical systems for which high image quality is required, such as digital still camera systems and digital video camera systems.

The lens system according to the implementations are also provided in interchangeable lens devices.

What is claimed is:

1. A lens system configured to form an image on an imaging element having a quadrilateral shape disposed on an optical axis, the lens system comprising:
   in order from an object side to an image side, a first lens group comprising two or more lens elements, an aperture diaphragm and a second lens group comprising two or more lens elements, wherein:
   the first lens group includes a first free-curved lens that is asymmetrical with respect to the optical axis,
   a free-curved surface of the first free-curved lens has
      negative refractive power with respect to a ray parallel to the optical axis at an intersection between a circle having a center at the optical axis and a diameter having a predetermined ratio with respect to a minimum image height and a first plane passing through the optical axis and parallel to longer sides of the imaging element, and
      positive refractive power with respect to a ray parallel to the optical axis at an intersection between a circle having a center at the optical axis and the diameter having the predetermined ratio with respect to the minimum image height and a second plane passing through the optical axis and parallel to shorter sides of the imaging element,
   the minimum image height is a shortest distance among distances on an image surface, from an image point by a ray entering perpendicularly onto imaging element to an end of an image circle formed by the lens system, and
   the predetermined ratio ranges from 40% to 80% inclusive.

2. The lens system according to claim 1, wherein the second lens group includes a second free-curved lens.

3. The lens system according to claim 2, wherein the second free-curved lens has an image side surface and an object side surface, each of which is a free-curved surface.

4. The lens system according to claim 1, wherein the first lens group further comprises, in order from the object:
   a first lens element that is a meniscus having a convex shape facing the object and having negative power; and
   a second lens element having negative power.

5. The lens system according to claim 4, wherein the first free-curved lens is closer to the image surface than the second lens element is, and has the free-curved surface on a side closer to the object.

6. The lens system according to claim 1, wherein at least three or more lens elements in the first lens group and the second lens group are rotational symmetrical with respect to the optical axis.

7. The lens system according to claim 1, wherein a condition (1) below is satisfied:

$$\omega_{LONG} > 60° \quad (1)$$

where, $\omega_{LONG}$ is a maximum half angle of view in a longer side direction of the imaging element.

8. The lens system according to claim 1, wherein a condition (2) below is satisfied:

$$1 < D_{LSHORT}/D_{SSHORT} \quad (2)$$

where, $D_{LSHORT}$ is a maximum distance in a longer side direction between an image point with respect to incident light in the longer side direction of the imaging element and an image point with respect to incident light perpendicular to the imaging element, within an angle of view equivalent to a maximum half angle of view in a shorter side direction of the imaging element, and $D_{SSHORT}$ is a maximum distance in the shorter side direction between an image point with respect to incident light and an image point with respect to incident light perpendicular to the imaging element, within the maximum half angle of view in the shorter side direction of the imaging element.

9. The lens system according to claim 1, wherein a condition (3) below is satisfied:

$$0.5 < D_{SSHORT} \times \omega_{LONG}/(D_{LLONG} \times \omega_{SHORT}) < 1 \quad (3)$$

where, $\omega_{LONG}$ is a maximum half angle of view in a longer side direction of the imaging element, $\omega_{SHORT}$ is a maximum half angle of view in a shorter side direction of the imaging element, $D_{LLONG}$ is a maximum distance in the longer side direction between an image point with respect to incident light and an image point with respect to incident light perpendicular to the imaging element, within the maximum half angle of view in the longer side direction of the imaging element, and $D_{SSHORT}$ is a maximum distance in the shorter side direction between an image point with respect to incident light and an image point with respect to incident light perpendicular to the imaging element, within the maximum half angle of view in the shorter side direction of the imaging element.

10. The lens system according to claim 1, wherein a condition (4) below is satisfied:

$$\omega_{LONG} - \omega_{SHORT} > 0 \quad (4)$$

where, $\omega_{LONG}$ is a maximum half angle of view in a longer side direction of the imaging element, and $\omega_{SHORT}$ is a maximum half angle of view in a shorter side direction of the imaging element.

11. The lens system according to claim 1, wherein a condition (5) below is satisfied:

$$L \times Fno./D_{LLONG} < 40 \quad (5)$$

where,

L is an optical total length of the lens system,

Fno. is an F value of the lens system, and $D_{LLONG}$ is a maximum distance in a longer side direction between an image point with respect to incident light and an image point with respect to incident light perpendicular to the imaging element, within a maximum half angle of view in the longer side direction of the imaging element.

12. The lens system according to claim 2, wherein a condition (6) below is satisfied:

$$n_{FREE} < 1.7 \quad (6)$$

where, $n_{FREE}$ is a refraction factor with respect to a d-line of the first free-curved lens or the second free-curved lens.

13. The lens system according to claim 1, further comprising:

lens elements; and an aperture diaphragm, wherein a condition (7) below is satisfied:

$$-3 \leq N_o - N_i \leq 3 \quad (7)$$

where, $N_o$ is a number of the lens elements including the first free-curved lens and disposed closer to an object than the aperture diaphragm is, and $N_i$ is a number of the lens elements disposed closer to an image surface than the aperture diaphragm is.

14. The lens system according to claim 1, wherein the imaging element does not include the image circle of the lens system.

15. A camera system comprising:

the lens system according to claim 1; and the imaging element having a quadrilateral shape and disposed at a position at which the lens system forms an image on the optical axis.

16. An imaging system comprising:

the lens system according to claim 1;

the imaging element having a quadrilateral shape and disposed at a position at which the lens system forms an image on the optical axis; and an image processor configured to process the image generated by the imaging element.

* * * * *